E. P. PALMER.
RECIPROCATING ENGINE.
APPLICATION FILED SEPT. 21, 1917.
1,353,539.
Patented Sept. 21, 1920.
4 SHEETS—SHEET 4.
Fig. 5
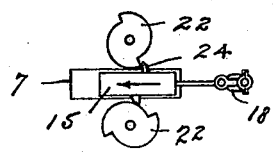 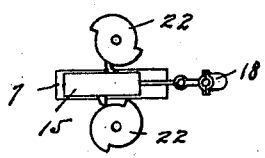
Fig. 6
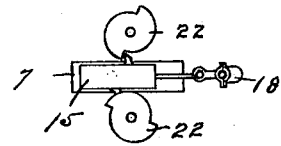 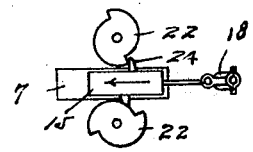
Fig. 7
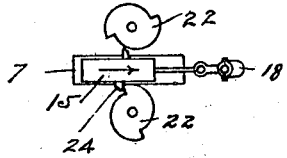 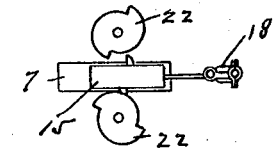
Fig. 8
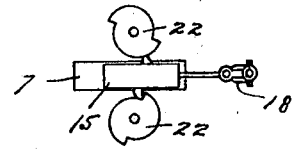 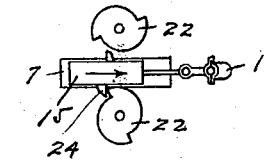
Fig. 9
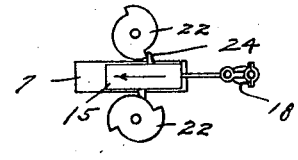 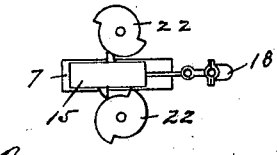
Fig. 10
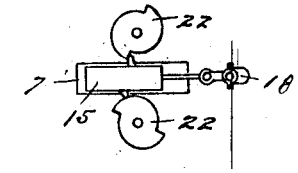 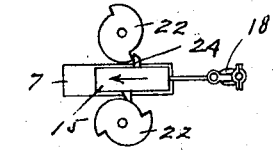
Fig. 11
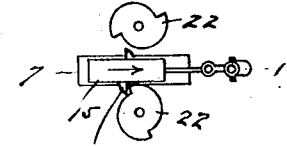 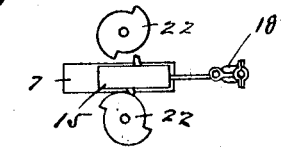
Fig. 12
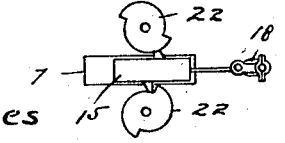 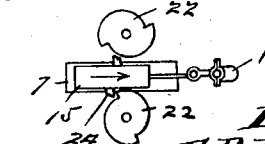
Witnesses
H. D. Kilgore
James Kilgore
Inventor
E. P. Palmer
By his Attorneys
Williamson & Merchant

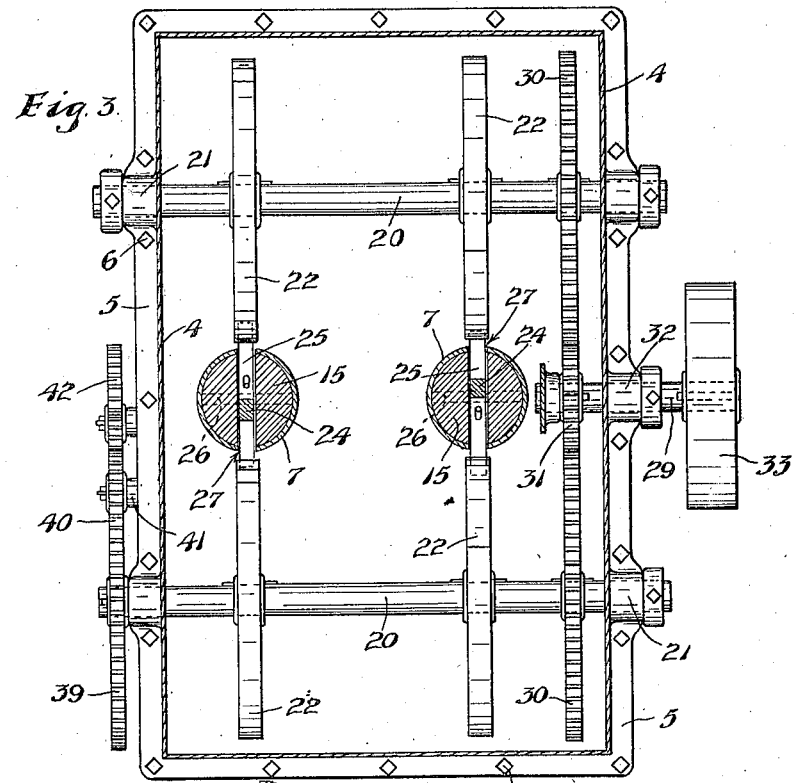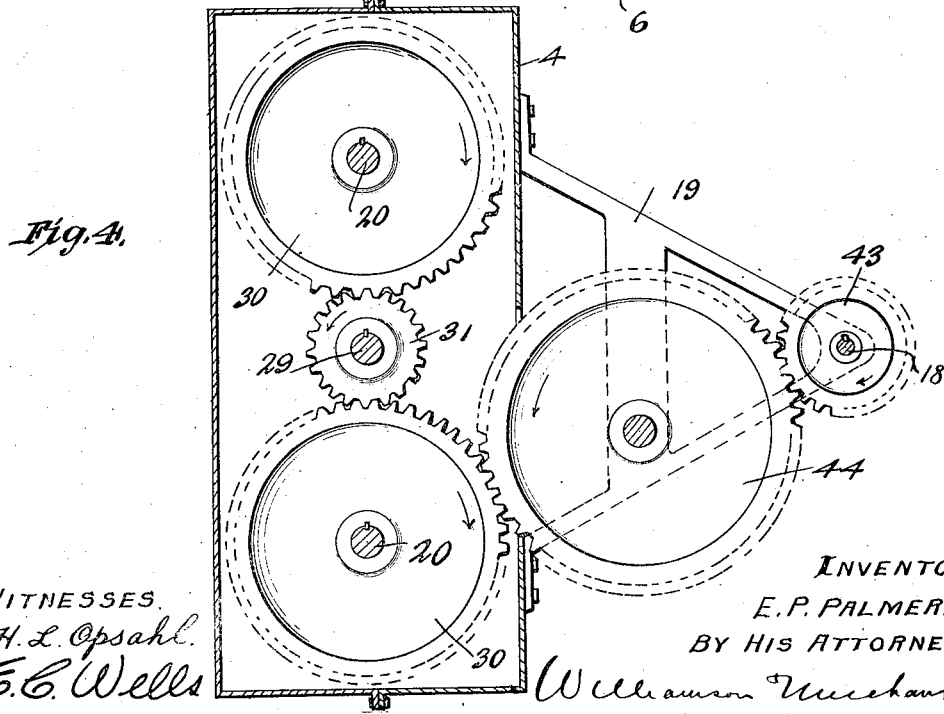

UNITED STATES PATENT OFFICE.

EDWARD P. PALMER, OF MINNEAPOLIS, MINNESOTA.

RECIPROCATING ENGINE.

1,353,539. Specification of Letters Patent. Patented Sept. 21, 1920.

Application filed September 21, 1917. Serial No. 192,479.

*To all whom it may concern:*

Be it known that I, EDWARD P. PALMER, a citizen of the United States, residing at Minneapolis, in the county of Hennepin and State of Minnesota, have invented certain new and useful Improvements in Reciprocating Engines; and I do hereby declare the following to be a full, clear, and exact description of the invention, such as will enable others skilled in the art to which it appertains to make and use the same.

My invention relates to improvements in reciprocating engines; and, to this end, it consists of the novel devices and combinations of devices hereinafter described and defined in the claims.

In the accompanying drawings, which illustrate the invention, like characters indicate like parts throughout the several views.

Referring to the drawings:

Fig. 3 is a view partly in end elevation and partly in vertical section taken on the line 3—3 of Fig. 1.

Fig. 4 is a view partly in elevation and partly in vertical section taken on the line 4—4 of Fig. 1; and Figs. 5 to 12, inclusive, are diagram views showing the different progressive positions throughout a cycle.

Figure 1:
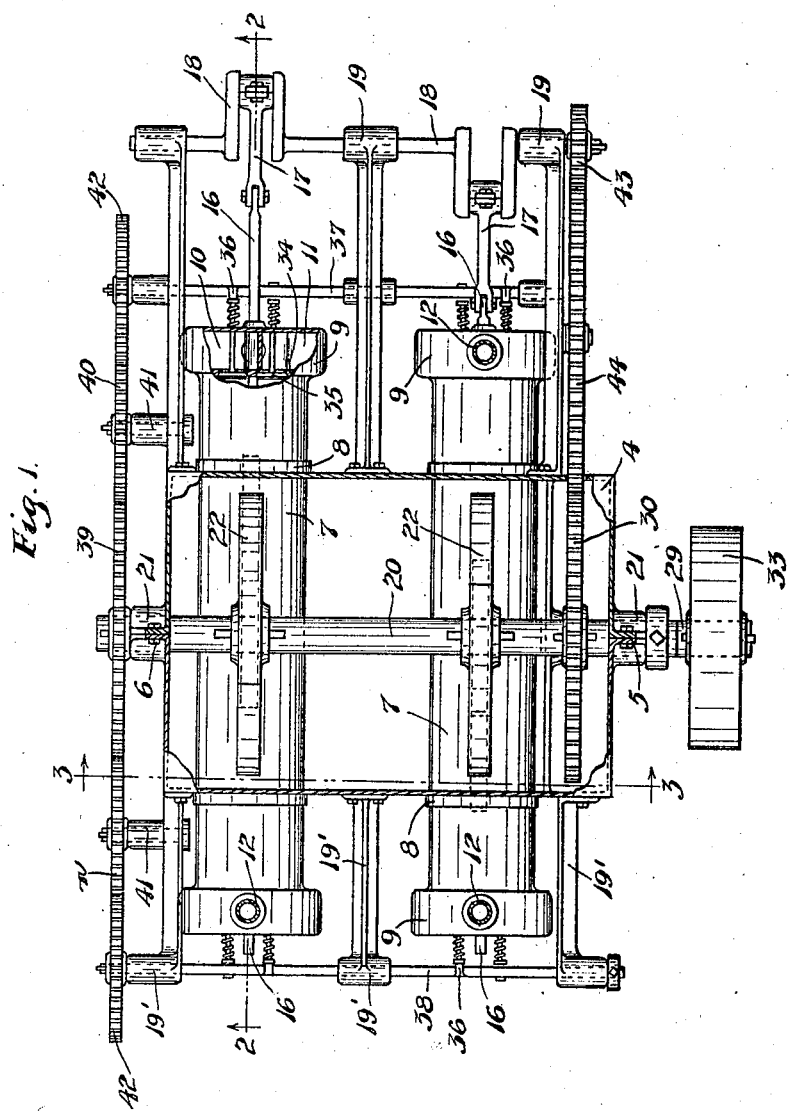
Figure 1 is a plan view of the invention with some parts broken away and other parts sectioned.
Figure 2:
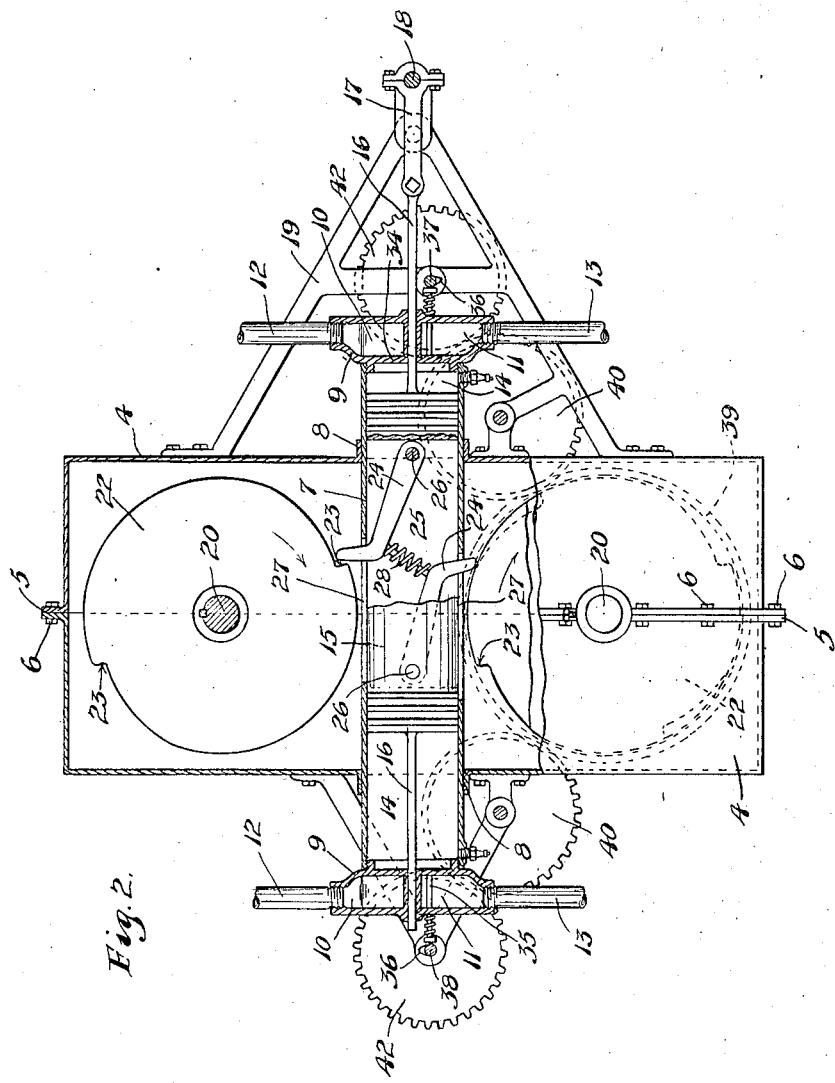
Fig. 2 is a view partly in end elevation and partly in vertical section taken on the line 2—2 of Fig. 1.

In the drawing the invention is designed as an internal combustion engine, but it, of course, may be designed to be operated by steam or any other suitable driving medium.

Referring now in detail to the invention, as shown in the drawings, the numeral 4 indicates a box-like housing made up of two duplicate vertically disposed sections. These sections of the housing 4 have on their abutting edges, out-turned flanges 5, in which are formed a multiplicity of alined pairs of holes through which are passed nut-equipped bolts 6 for detachably connecting said sections.

The improved reciprocating engine has two horizontal cylinders 7 that are horizontally spaced and mounted in axially alined pairs of seats 8 formed in opposite walls of the housing 4. The ends of these cylinders 7 extend outward of the sides of the housing 4 and have screwed thereon heads 9, in each of which is formed a fuel intake chamber 10 and an exhaust chamber 11. Leading to each chamber 10 is a fuel supply pipe 12 and leading from each chamber 11 is an exhaust pipe 13.

Compression chambers 14 are found in opposite ends of each cylinder 7 and mounted in each of said cylinders between its compression chambers is a duplex piston 15. Projecting in opposite directions from the ends of the pistons 15 are stems 16 which work through the heads 9. In actual construction suitable stuffing-boxes, not shown, will be provided for the piston stems 16. To limit the strokes of the pistons 15, their right hand stems 16 are pivotally connected by links 17 to the cranks of a crank shaft 18 journaled in bearing brackets 19 secured to the housing 4. By reference to Fig. 1, it will be noted that these cranks are set 180 degrees apart, so that the pistons 15 always move in opposite directions with respect to each other.

A pair of horizontal shafts 20 is located in the housing 4, and vertically spaced with the cylinders 7 extending transversely therebetween. These shafts 20 are journaled in coöperating half bearings 21 formed in the abutting edges of the sections of the housing 4 and their flanges 5. Keyed to each shaft 20 is a pair of large ratchet wheels 22, each of which is provided with two diametrically opposite teeth 23. The ratchet wheels 22 on the two shafts 20 are arranged in vertically alined pairs, and each of said pairs is located on the projected vertical axis of one of the cylinders 7. It is important to note that there are eight ratchet teeth 23, taking the ratchet wheels 22 collectively, and which ratchet teeth are circumferentially spaced equal distances apart. It is also important to note that the ratchet teeth 23 on the upper ratchet wheels 22 are reversely arranged from the ratchet teeth on the lower ratchet wheels.

Carried by each piston 15 is a pair of reversely acting upper and lower pawls 24 arranged to engage the ratchet teeth 23 and impart steps of movement to the ratchet wheels 22 and hence, the shafts 20. These pawls 24 are mounted in radial slots 25 cut completely through the pistons 15 between the heads thereof, and are pivotally connected to said pistons for radial movements by pins 26. The free ends of the pawls 24 work in slots 27 cut in the cylinders 7 for action on the teeth of the ratchet wheels 22. Coiled springs 28 compressed between the pairs of pawls 24 yieldingly hold said pawls onto the peripheries of the ratchet wheels 22.

Under the reciprocatory movements of the pistons 15 during one of their strokes, the upper pawl 24 on one of said pistons imparts a one-eighth step of movement to the overlying ratchet wheel 22, and hence, the upper shaft 20, and the upper pawl 24 on the other of said pistons imparts a one-eighth step of movement to the overlying ratchet wheel 22, and hence, the upper shaft 20. During this stroke of the pistons 15, the other pawls 24 are idle, and simply ride over the respective wheels 22, but become active on the next stroke of said pistons to continue the rotation of the shafts 20. It will thus be seen that the pawls 24 and ratchet wheels 22 impart continuous rotary movement to the shafts 20 in the same direction.

Power from the two shafts 20 is transmitted to a driven shaft 29 through timed connections, as shown, comprising a pair of alined gears 30 keyed to the shafts 20, and an intermediate pinion 31 meshing therewith and keyed to the inner end of said driven shaft. The inner end of the driven shaft 29 is journaled in a bearing 32 formed with the housing 4, and the gears 30 and pinion 31 are located in said housing. A fly-wheel 33 is keyed to the driven shaft 29 just outside of the housing 4. Obviously, the timed connections between the shafts 20 and shaft 29 drive said shaft 29 in a constant direction.

Communicating ports 34 between the fuel intake chambers 10 and compression chambers 14 and between the exhaust chambers 11 and compression chambers 14 are normally closed by spring held valves 35 which are opened by timed cams 36 on shafts 37 and 38. The shaft 37 is journaled in the bearing brackets 19 and the shaft 38 is journaled in bearing brackets 19' on the opposite side of the housing 4 from said bearing brackets 19. The cam shafts 37 and 38 are driven from the lower shaft 20 through timed connections comprising a relatively large gear 39 keyed to said lower shaft and meshing with a pair of intermediate idle gears 40 journaled in bearings 41 on the housing 4, and which idle gears in turn mesh with gears 42 keyed to the said cam shafts.

The crank shaft 18, which controls the strokes of the pistons 15 and keeps the same in their respective relative arrangements, is in turn controlled with respect to the cam shafts 37 and 38 by timed connections between the gear 30 on the lower shaft 20 and said crank shaft. This timed connection comprises a relatively small gear 43 keyed to the crank shaft 18 and a relatively large idle intermediate gear 44 journaled to one of the bearing brackets 19 and meshing with the lower gear 30 and the gear 43. The gear 30 has four times as many teeth as the gear 43, so that the crank shaft 18 makes four revolutions to one of the shaft 20.

Figs. 5 to 12, inclusive, diagrammatically illustrate the different positions of the pistons and ratchet wheels, while the driven shaft 29 is making one complete cycle. All of the views at the left, in Figs. 5 to 12, inclusive, indicate different positions of the same piston, and likewise, the views to the right indicate different positions of the other piston. It may also be here stated that the upper two ratchet wheels are keyed to the upper shaft 20 and both of the lower ratchet wheels 22 are keyed to the lower shaft 20, and both shafts 20 are connected to the driven shaft 29 by an intermediate gear 31.

To trace one complete cycle of the driven shaft 29, it will be noted that the piston at the left in Fig. 5 is about to make its working stroke, and that its upper pawl 24 is engaging one of the teeth of the respective ratchet wheel, and, at the completion of its working stroke, will have imparted a $\frac{1}{8}$th movement to the upper shaft 20.

During the working stroke of the left-hand piston in Fig. 5, the right-hand piston is making its return stroke and both of its pawls are idle. At the completion of the working stroke of the left-hand piston, the right-hand piston in Fig. 6 is about to make its working stroke and its upper pawl 24 is engaging one of the teeth in the respective ratchet wheel, and, at the completion of this working stroke, will have imparted a further $\frac{1}{8}$th movement to the upper shaft 20. It will thus be seen that a $\frac{1}{4}$th movement has been imparted to the upper shaft 20.

During the working stroke of the left-hand piston in Fig. 6, the right-hand piston is making its return stroke and both of its pawls are idle. At the completion of the working stroke of the right-hand piston, the left-hand piston, as shown in Fig. 6, is about to make its working stroke and its lower pawl is in engagement with one of the teeth of the respective ratchet wheel. At the completion of this working stroke, a $\frac{1}{8}$th movement will have been imparted to the lower shaft 20, and at which time the right-hand piston in Fig. 7 is making its return stroke and its pawls are idle. At the completion of the working stroke of the left-hand piston in Fig. 7, the right-hand piston in Fig. 8 is about to begin its working stroke and its lower pawl is in engagement with one of the teeth of the respective ratchet wheel, and, at the completion of this stroke, a further $\frac{1}{8}$th movement will have been imparted to the lower shaft 20, or $\frac{1}{4}$ in all and completing one-half of the cycle of the driven shaft 29.

During the working stroke of the right-hand piston in Fig. 8, the left-hand piston is making its return stroke and its pawls are idle. At the completion of the working stroke of the right-hand piston in Fig. 8, the left-hand piston in Fig. 9 is about to start its working stroke, and it will be noted that its upper pawl is in engagement with its respective ratchet wheel, and, at the completion of this stroke, will have imparted a further ⅛th movement to the upper shaft 20.

During the working stroke of the left-hand piston in Fig. 9, the right-hand piston is making its return stroke and its pawls are idle. At the completion of the working stroke of the left-hand piston in Fig. 9, the right-hand piston in Fig 10 is about to begin its working stroke, and it will be noted that its upper pawl is in engagement with one of the teeth of the respective ratchet wheel. At the completion of this working stroke, a further ⅛th movement will have been imparted to the upper shaft 20 by the left and right-hand pistons in Figs. 9 and 10.

During the working stroke of the right-hand piston in Fig. 10, the left-hand piston is making its return stroke and its pawls are idle. At the completion of the working stroke of the right-hand piston in Fig. 10, the left-hand piston in Fig. 11 is about to begin its working stroke, and it will be noted that its lower pawl is in engagement with one of the teeth of the respective ratchet wheel, and, at the completion of this working stroke, a further ⅛th movement will have been imparted to the lower shaft 20.

During the working stroke of the left-hand piston in Fig. 11, the right-hand piston is making its return stroke and its pawls are idle. At the completion of the working stroke of the left-hand piston in Fig. 11, the right-hand piston in Fig. 12 is about to begin its working stroke, and it will be noted that its lower pawl is in engagement with the lower ratchet teeth of the respective ratchet wheel, and, at the completion of this working stroke, will have imparted a further ⅛th movement to the lower shaft 20, which completes the cycle of the driven shaft 29. During the working stroke of the right-hand piston in Fig. 12, the left-hand piston is making its return stroke, and its pawls are idle.

The above described invention is very simple to manufacture and assemble for the reason that duplicate parts are used throughout the construction thereof.

What I claim is:

1. The combination with two cylinders of a reciprocating engine, of a duplex piston mounted in each of said cylinders, means for alternately rendering the driving medium effective in the ends of said two cylinders, a rotary driven member, a pair of shafts on opposite sides of said cylinders, a pair of ratchet wheels secured to each of said shafts, a pair of reversely acting pawls carried by each of said pistons for imparting steps of movement to the ratchet wheels, said ratchet wheels being set the one in advance of the other, and driving connections from said two shafts to the driven member.

2. The combination with two cylinders of a reciprocating engine, of a duplex piston mounted in each of said cylinders, means for alternately rendering the driving medium effective in the ends of said two cylinders, a rotary driven member, a pair of shafts on opposite sides of said cylinders, a pair of ratchet wheels secured to each of said shafts, a pair of reversely acting pawls carried by each of said pistons for imparting steps of movement to the ratchet wheels, said ratchet wheels being set the one in advance of the other and arranged to alternately impart two steps of movement to the shafts, and driving connections from said two shafts to the driven member.

3. The combination with two cylinders of a reciprocating engine, of a duplex piston mounted in each of said cylinders, means for alternately rendering the driving medium effective in the ends of said two cylinders, a rotary driven member, a pair of shafts on opposite sides of said cylinders, a pair of ratchet wheels secured to each of said shafts, a pair of reversely acting pawls carried by each of said pistons for imparting steps of movement to the ratchet wheels, driving connections from said two shafts to the driven member, and a crank shaft, each of said pistons being connected to the crank shaft to limit the travel thereof.

4. The combination with two cylinders of a reciprocating engine, of a duplex piston mounted in each of said cylinders, means for alternately rendering the driving medium effective in the ends of said two cylinders, a rotary driven member, a pair of shafts on opposite sides of said cylinders, a pair of ratchet wheels secured to each of said shafts, a pair of reversely acting pawls carried by each of said pistons for imparting steps of movement to the ratchet wheels, driving connections from said two shafts to the driven member, a crank shaft, each of said pistons being connected to the crank shaft to limit the travel thereof, and time connections between the driven member and the crank shaft.

In testimony whereof I affix my signature in presence of two witnesses.

EDWARD P. PALMER.

Witnesses:
 EVA E. KÖNIG,
 HARRY D. KILGORE.